Patented Feb. 6, 1923.

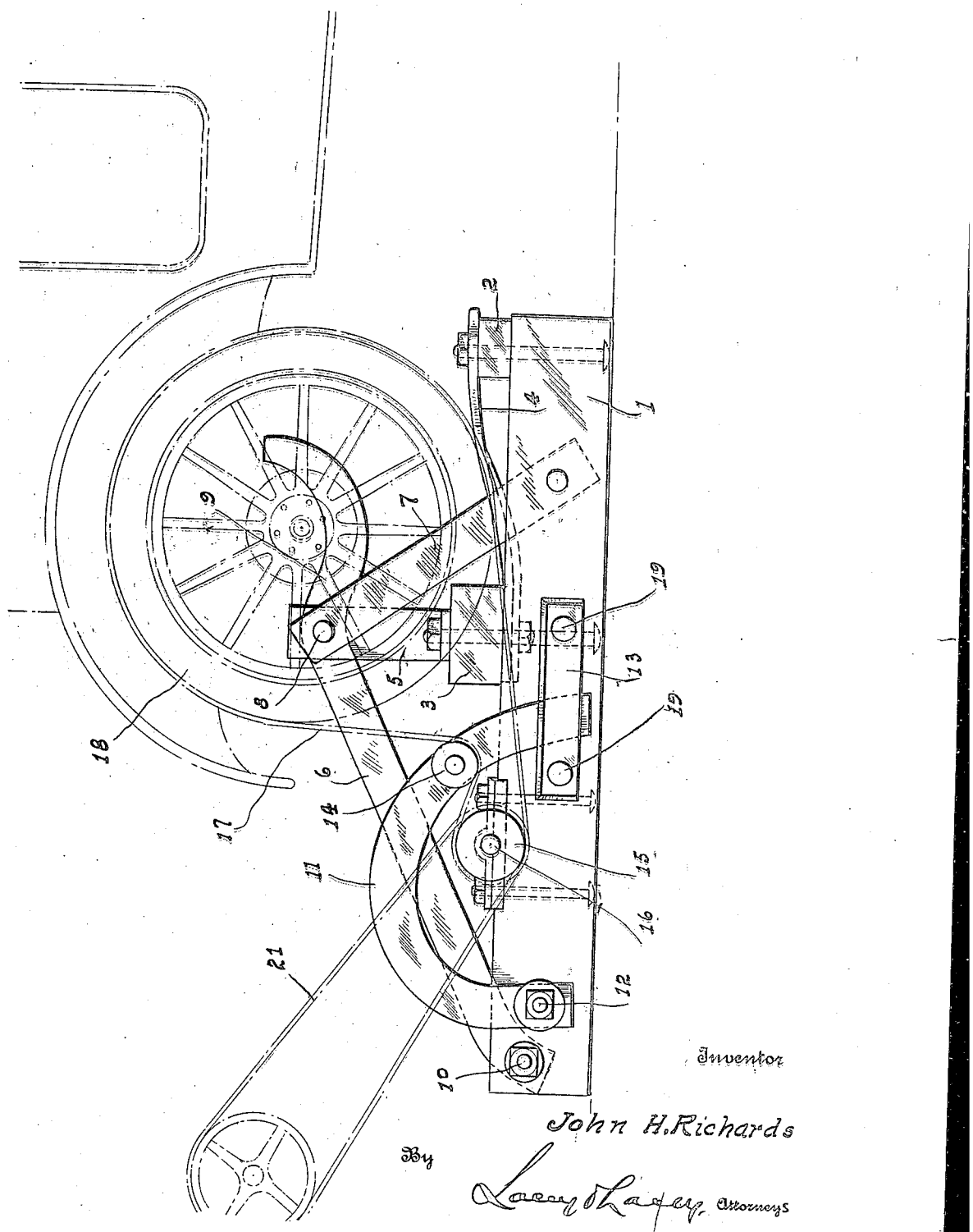

1,444,273

UNITED STATES PATENT OFFICE.

JOHN H. RICHARDS, OF NAPER, NEBRASKA.

POWER-TRANSMITTING APPARATUS.

Application filed January 11, 1921. Serial No. 436,481.

*To all whom it may concern:*

Be it known that I, JOHN H. RICHARDS, a citizen of the United States, residing at Naper, in the county of Boyd and State of Nebraska, have invented certain new and useful Improvements in Power-Transmitting Apparatus, of which the following is a specification.

This invention has for its object the provision of simple, inexpensive, strong, durable and easily adjusted means whereby an automobile may be supported with its driving wheels above the ground and the power of the automobile engine utilized to operate machinery. The invention is illustrated in the accompanying drawings and consists in certain novel features which will be particularly pointed out in the claims following a detailed description.

In the drawings—

The figure is a side elevation of my improved aparatus showing the same arranged for use.

In carrying out my invention, I employ a pair of sills 1 which are joined at one end by a cross bar 2 and are also connected intermediate their ends by a cross bar or beam 3, as clearly shown. These parts are rigidly secured together by suitable bolts and braces 4 which are secured to the cross bars and extend from the ends of the bar 2 to the center of the bar 3, so that a very rigid and strong structure is produced. Upon the cross beam 3 at each end thereof, I secure a pair of short standards or brackets 5 and between the upper ends of each pair of standards I pivotally mount a lever or lifting member 6. A brace 7 is secured at one end to the sill 1 and has its upper end secured by the bolt 8 which constitutes the fulcrum or pivot of the lever 6 so that the lever is firmly supported and spreading of the standards or brackets 5 is prevented. Each lever 6 is constructed at its working end with a seat 9 for the axle of the automobile and this seat may be conveniently formed by curving the working end of the lever, as will be readily understood upon reference to the drawing. The seat 9 is provided on the short arm of the lever or lifting member 6 and the long arm of the lever extends to the end of the sill more remote from the standards 5 and is adapted to be secured to the sill by a bolt 10, as clearly shown. When the device is in use, as indicated, with the rear end of an automobile supported by the members 6, the handle end of the lever is secured by the bolt 10 so that it will be firmly held against movement and will effectually support the automobile.

Adjacent the bolt 10, an arcuate bracket 11 is pivotally attached to the sill 1 by a bolt 12 and this bracket or arm 11 extends toward the beam 3 and standards 5 and has its free end inserted between a clamping plate 13 and the adjacent side of the sill 1, as will be readily understood. An idler 14 is carried by the bracket 11 and a pulley 15 is secured upon the end of a shaft 16 which is journaled in suitable bearings secured upon the upper side of the sill, and as will be readily understood. A belt 17 is trained around each driving wheel of the automobile and the pulley 15 and passes under the idler 14, so that if the engine of the automobile be set in action, the power generated will be transmitted to the shaft 16 from the driving wheels 18 through the belt 17 and the pulley 15 as is obvious. The idler 14 constitutes a belt tightener so as to compensate for stretching of the belt and is adjusted to take up the wear by swinging the bracket or arm 11 pivotally upon the bolt 12 and securing the clamping plate 13 firmly against the free end of the arm or bracket by the bolts 19 which are inserted through the ends of the clamping plate and the sill, as shown. The levers 6, the brackets or arms 11 and the pulleys and belt are duplicated at the two sides of the apparatus so that both driving wheels of the automobile may be utilized for transmitting power. A pulley 20 is secured upon the shaft 16 between the sills and a belt 21 is trained around the said pulley and around any rotating member which is to be driven.

From the foregoing description, taken in connection with the accompanying drawing, it will be readily understood that I have provided a very simple, compact, inexpensive and easily adjusted mechanism by the use of which the rear end of an automobile may be effectually supported above the ground or above the floor of a garage and the power of the automobile engine utilized to drive machinery such as a rotary saw, a pump, or other mechanism. The belt which is trained around the automobile wheel may be very easily kept taut inasmuch as the adjustment of the arm or bracket 11 will occupy but a few seconds of time.

Having thus described the invention, what is claimed as new is:

1. In an apparatus for the purpose set forth, the combination of a base, a driven pulley on the base, a belt for driving said pulley, means for communicating motion to the belt, and a belt tightener comprising an arcuate bracket pivotally secured at one end to the base, the driven pulley being located between the ends of the bracket, an idler carried by said bracket and bearing upon said belt, and a clamping plate adapted to grip the free end of the bracket in adjusted position and binding said free end to the base, and means for holding said plate rigidly in the clamped position.

2. In combination with a belt transmission including a base, a pulley thereon, a belt and means for communicating motion to the belt for driving the pulley; of a belt tightener comprising an arcuate oscillatable arm, a pivot for said arm on said base situated to one side of said pulley, an idler mounted on said arm in position for engaging said belt on the other side of the pulley, the free end of said arm extending beyond said idler, a clamping plate adapted to engage said free end and bolts for drawing said plate toward the base, thereby tightly clamping said free end in adjustable position between the base and the clamping plate.

In testimony whereof I affix my signature.

JOHN H. RICHARDS. [L. S.]